P. WRIGHT.
MACHINE FOR FEEDING AND CUTTING WIRE.
APPLICATION FILED SEPT. 12, 1921.

1,435,438.

Patented Nov. 14, 1922.
6 SHEETS—SHEET 2.

Fig. 2.

Inventor
Parvin Wright, by
T. G. Witherspoon
Attorney

Patented Nov. 14, 1922.

1,435,438

UNITED STATES PATENT OFFICE.

PARVIN WRIGHT, OF CHICAGO, ILLINOIS.

MACHINE FOR FEEDING AND CUTTING WIRE.

Application filed September 12, 1921. Serial No. 500,130.

*To all whom it may concern:*

Be it known that I, PARVIN WRIGHT, a citizen of the United States, residing at Chicago, in the county of Cook and State of Illinois, have invented certain new and useful Improvements in Machines for Feeding and Cutting Wires; and I do hereby declare the following to be a full, clear, and exact description of the invention, such as will enable others skilled in the art to which it appertains to make and use the same.

This invention relates to a machine for guiding a plurality of wires from a plurality of coils, to a feeding means, and then cutting them off in predetermined lengths, and has for its object to provide a mechanism of this character which will be simple in construction, comparatively inexpensive to manufacture, and more efficient in practice than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views.

1 indicates any suitable base, 2 and 3 side members of the frame rising from the base, 4 a table like member connecting the sides 2 and 3, and 5 a top strip like member constituting a portion of the frame, all as will be clear from Figures 1, 2, 4 and 5.

Mounted on the base 1 is the motor 6 provided with the power shaft 7 turning the power pulley 8, around which passes the belt 9 leading over the wheel 10 mounted on the shaft 11, which carries the driving gear 12, all as will be clear from the drawings.

Figure 2:
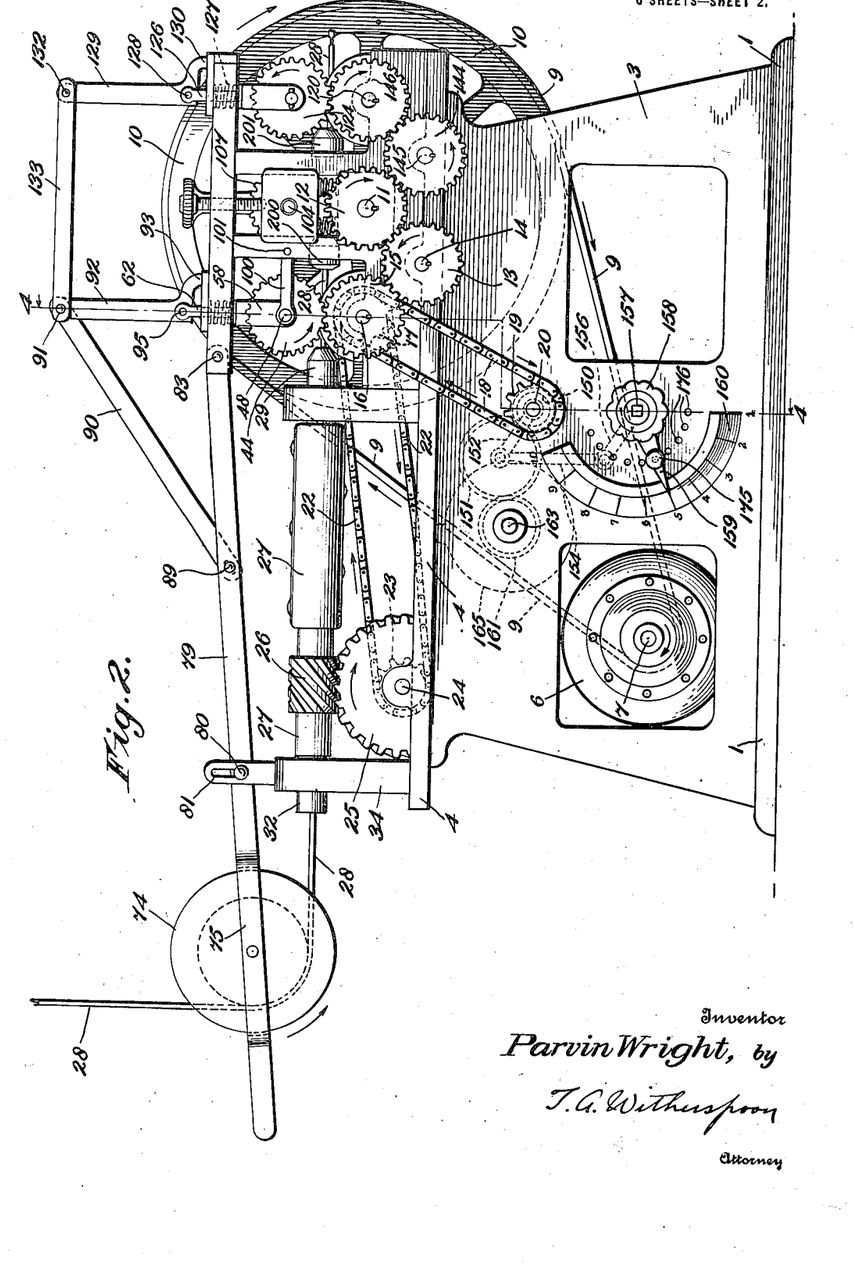
Figure 2 is a view similar to Figure 1, but showing the parts from the side opposite to that appearing in Figure 1.
Figure 4:
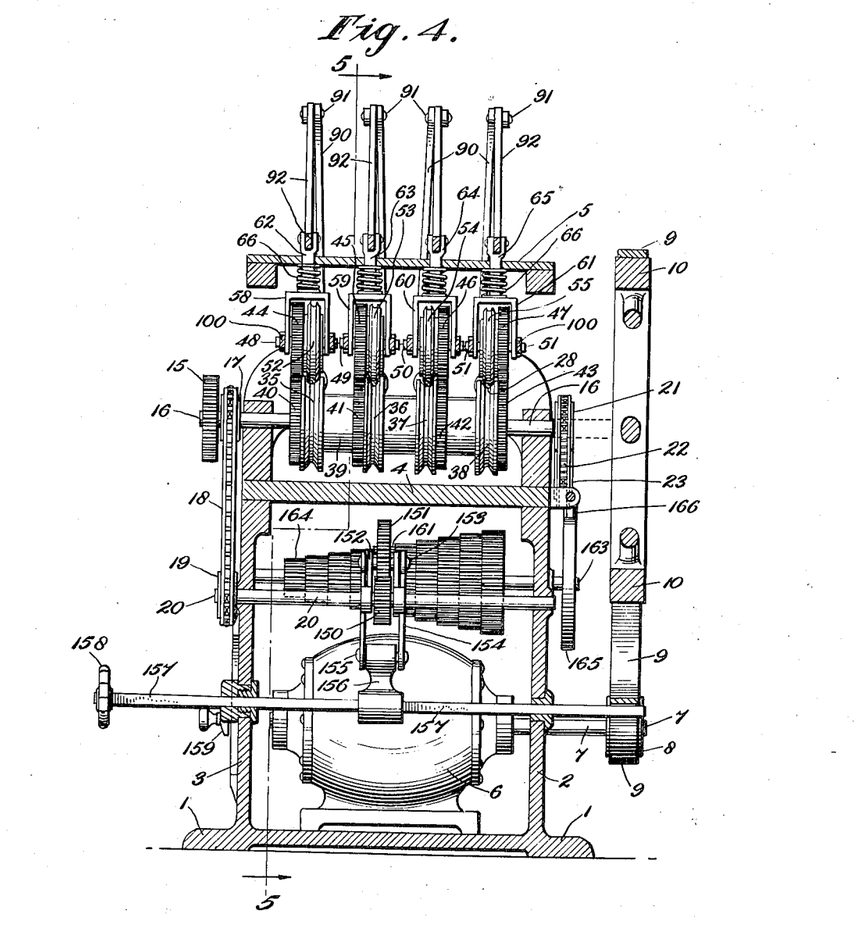
Figure 4 is a cross sectional view of the machine taken on the line 4—4 of Figure 2, looking in the direction of the arrows.

The driving gear 12, see Figure 2, meshes with the gear 13 mounted on the stud shaft 14 meshing with the gear 15 mounted on the shaft 16, carrying the sprocket 17 around which passes the chain 18 driving the sprocket 19 mounted on the shaft 20, all as is best shown in Figures 2 and 4.

Figure 1:
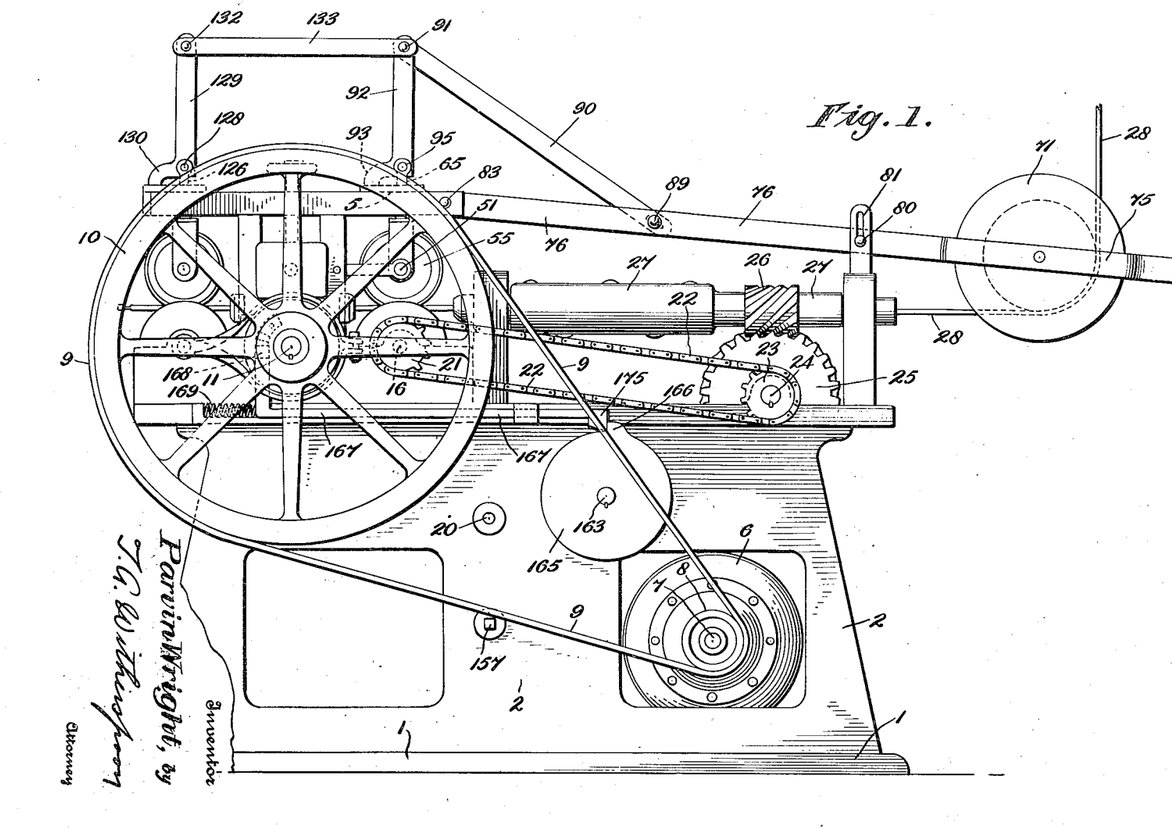
Figure 1 is a side elevational view of a machine made in accordance with this invention.
Figures 5, 6:
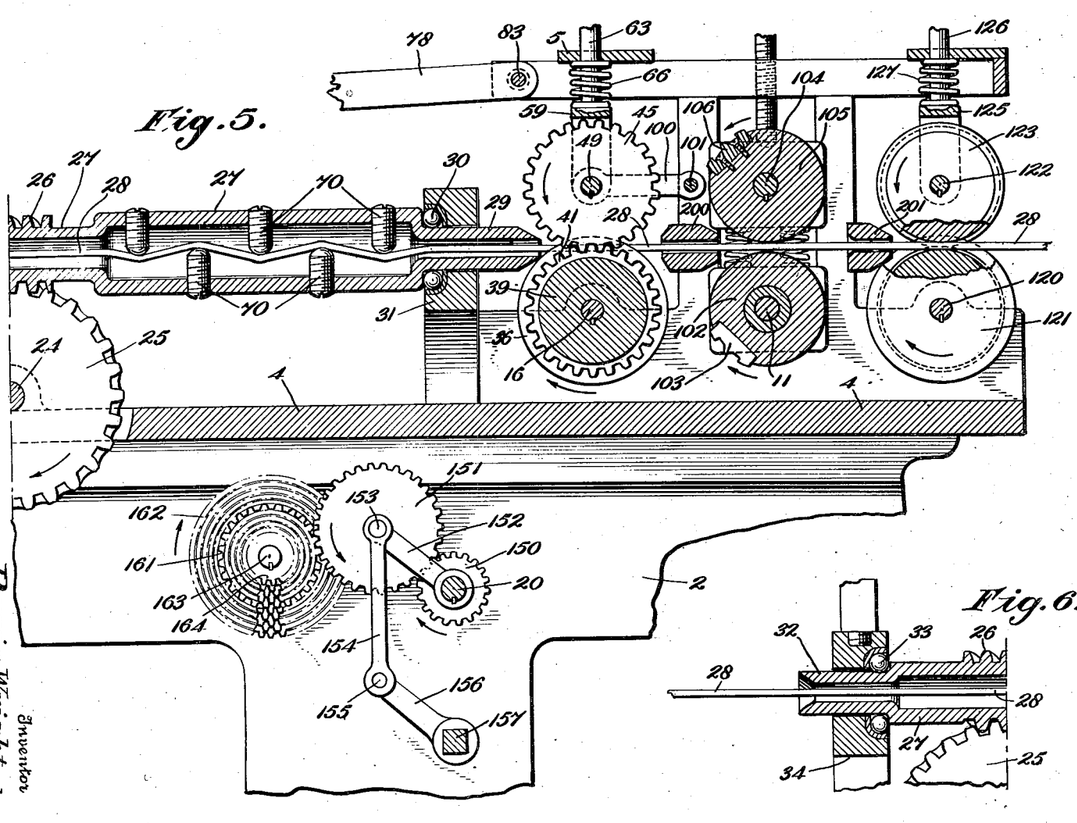
Figure 5 is a longitudinal sectional view of a portion of the parts shown in Figure 1, taken on the line 5—5 of Figure 4, looking in the direction of the arrows.
Figure 6 is an enlarged detail sectional view of a portion of the wire straightening mechanism.

Also mounted on the shaft 16, see Figures 1 and 2, is the sprocket 21, around which passes the driving chain 22, which latter passes around the sprocket 23 mounted on the shaft 24 carrying the spiral gear 25 meshing with the companion gear 26 rigid with the hollow barrel of the wire straightening member 27 through which passes the wire 28, as best illustrated in Figures 1 and 5. The wire straightening barrel 27 has at one end a reduced portion 29 working in the ball bearings 30 mounted in the standard 31 supported from the table member 4 and at its other end it has a similar reduced portion 32, see Figure 6, working in the ball bearings 33 supported in the standard 34 also mounted on the table member 4, see Fig. 2.

It thus results that power being imparted by the motor 6 to the driving shaft 7, it is transmitted by the pulley 8, belt 9, and driving shaft 11, to the gears 12, 13 and 15 and the shaft 16, which transmits motion to the sprocket 21, Fig. 1, and to the chain 22 which turns the sprocket 23, shaft 24, gear 25, gear 26 and wire guiding and straightening member 27.

It will be understood that this machine is capable of handling a plurality of wires, that its essential parts are duplicated, and that therefore, description of one will serve for all.

A wire 28 having been passed through the guiding and straightening member 27, it is next passed between the grooved feed rolls, now to be described. That is to say, mounted on the shaft 16, see Figs. 4 and 5, are the grooved feed rolls or members 35, 36, 37 and 38, which are rigid with the drum 39, through which said shaft 16 passes. Also rigid with the said grooved members are the driving gears 40, 41, 42, and 43, respectively meshing with the gears 44, 45, 46 and 47 mounted respectively on the short shafts 48, 49, 50 and 51. Also rigid with said last named gears and respectively mounted on said last named shafts are the grooved feed rolls or members 52, 53, 54 and 55, which respectively co-act with the grooved feed rolls 35, 36, 37 and 38. The gears 44, 45, 46 and 47 together with their corresponding grooved members 52, 53, 54 and 55, are supported respectively by the U-shaped members 58, 59, 60, and 61, provided respectively with the stems 62, 63, 64 and 65, each surrounded by a coil spring 66, as shown.

Accordingly, when a wire such as 28 has been passed through the guiding and straightening member 27, it is also passed between the pair of grooved rolls such as 36 and 53, as will be clear from Figs. 4 and 5, and as said grooved members are driven from the shaft 16 through the gears 41 and 45, the said wire is pulled forcibly through its corresponding guide member 27, while the latter is revolving, and as its course through said member 27 is made tortuous by means of the adjustable members 70, said wire generates considerable friction and becomes perfectly straight after leaving said pair of grooved rolls 36 and 53, in the manner well known.

Figure 3:
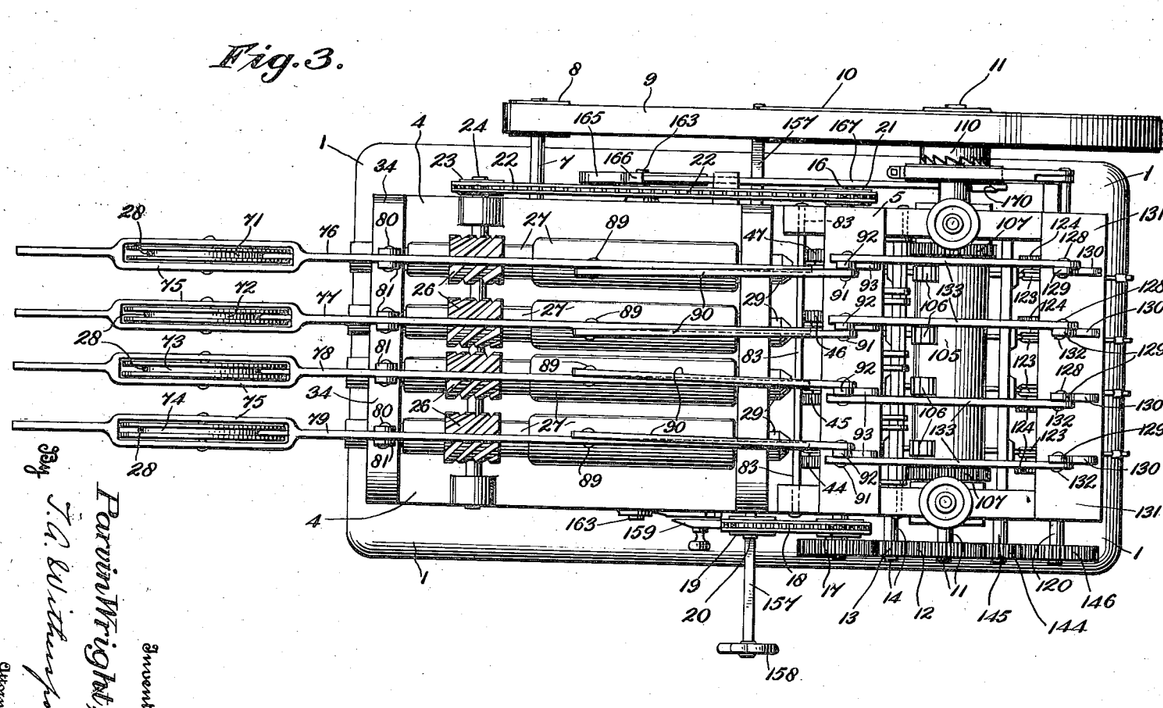
Figure 3 is a top plan view of the parts shown in Figures 1 and 2.

There is a plurality of wires 28, each passing over a guide pulley such as 71, 72, 73, and 74, held in supports such as 75, rigid with the supporting levers 76, 77, 78 and 79, which levers are pivoted to the framework of the machine as at 83, all as will be clear from Figs. 2 and 3. Each of the said levers is mounted on a pin such as 80, carried in a slotted upright such as 81, mounted on the support 34, as will be clear from the drawings. Likewise, there is a plurality of wire guiding and straightening tubes 27, one for each wire 28, and each tube member 27 is rotated by spiral gears 25 and 26, all as is shown in Fig. 2. Each wire 28 after passing through its corresponding guide member 27, passes between its corresponding pair of grooved feed rolls such as 53 and 36, see Figs. 4 and 5.

It thus results that should any wire such as 28 as it passes over its guide pulley such as 71 from its reel, not shown, become entangled or kinked in any way, so that it would offer an abnormal friction or resistance, the corresponding lever 76 supporting said pulley would lift, thus carrying its corresponding pin 80 upward in its corresponding slot 81; and this lifting action being around its pivot 83, as a center, the pivotal point 89 of the corresponding connecting member or link 90 will be lifted, as will be clear from Figs. 1 and 2. The lifting of the link 90 through an excess of friction or the kinking of the wire 28 will exert a push on a pivot such as 91 with which the upright members 92 are provided, which will cause the upper ends of said members 92 to be thrown over toward the left, as seen in Fig. 1, around their toes such as 93 as a fulcrum, which toes rest upon the plate like member 5.

To each of the members 92 are pivoted as at 95 the above mentioned stems 62, 63, 64 and 65, so that whenever a member 92 is thus tipped through the kinking of its corresponding wire 28, its corresponding stem such as 63 will be lifted against the compression of its corresponding spring 66, which will lift its corresponding U-shaped member such as 59, thereby raising the upper grooved feeding roll such as 53, from its corresponding grooved lower roll 36, releasing the friction between the said feed members so that the corresponding kinked wire will cease to be fed between said roll members, without stopping the feeding of the other wires through the other feed rolls.

It should be stated that each of the upper feed roll members such as 44 carried by a U-shaped member such as 58, is held by a U-shaped member 100, pivoted as at 101 to the frame of the machine, see Fig. 2, so that when the above mentioned lifting action takes place the parts are guided by said member 100, to the end that when the spring 66 returns the parts, this said member 100 insures the correct re-engagement of the driving gears such as 40 and 44, all as will be clear from Figures 2 and 4.

It will be seen that the lower feed drum 39 is continuous and has mounted thereon the grooved feed members 35 to 38 inclusive, and the gear members 40 to 43 inclusive, while each of the corresponding upper feed rolls is part of an integral unit, capable of being independently lifted from the lower rolls in the manner just described.

Figures 7, 8, 9, 10:
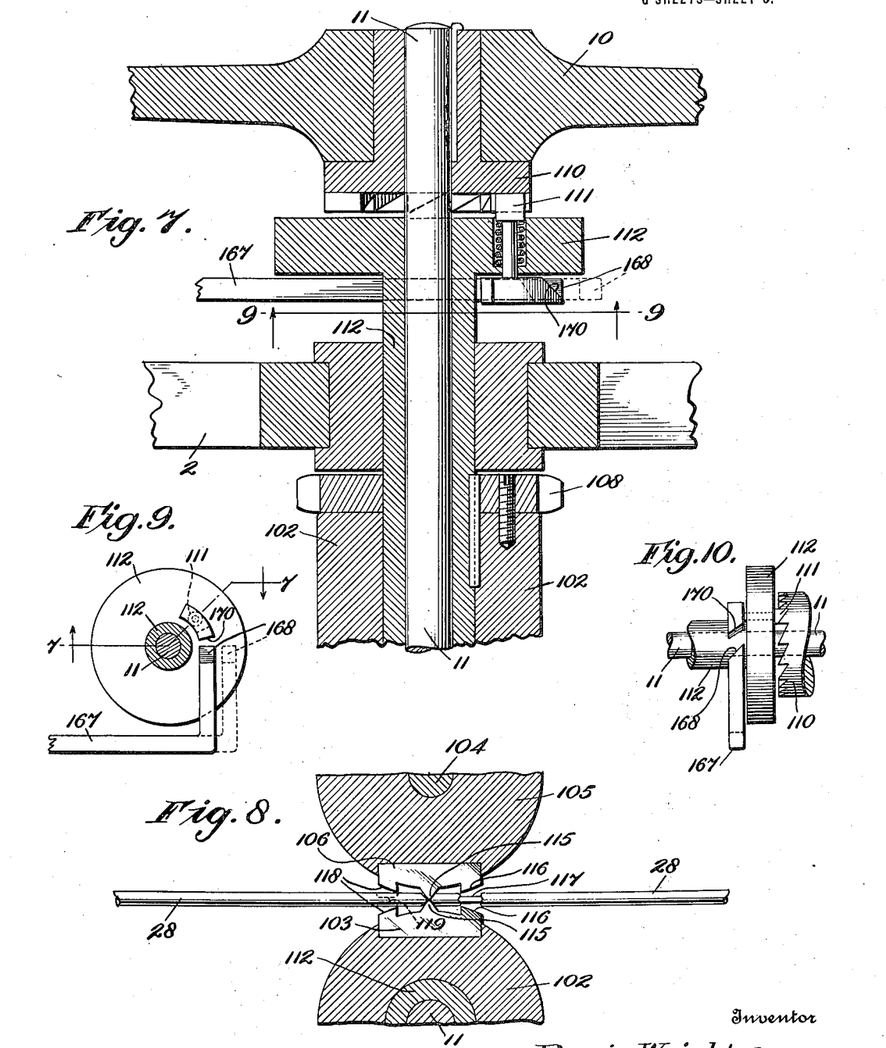
Figure 7 is a sectional view of the clutch mechanism for intermittently cutting off the power from the machine.
Figure 8 is an enlarged sectional detail view, illustrating the wire deforming and cutting dies.
Figure 9 is a transverse sectional elevational view of the clutch mechanism shown in Figure 7, taken approximately on the line 9—9 of said figure.
Figure 10 is a side elevational view of the parts shown in Figure 9.

Mounted on the shaft 11 is a continuous roll 102 provided with the cutting and deforming dies 103. Above this roll 102 is a corresponding continuous roll 105 mounted on the shaft 104, which carries the complemental cutting and deforming dies 106. At each end of the roll 105 is a gear 107, see Figs. 3 and 7, which gears engage companion gears 108 on the lower roll 102, only one of which is shown in Fig. 7, so that when said roll 102 is turned by the shaft 11, the roll 105 is also turned.

The shaft 11 and wheel 10 have rigidly attached thereto a clutch member 110, Figs.

3 and 7, which is, as will be presently described, intermittently engaged with the clutch member 111, and when so engaged a sleeve like member 112 which is rigid with the lower roll 102 is turned. On the other hand, when said clutch member 111 is disengaged from the clutch member 110, power is cut off from the lower roll 102, and therefore said lower roll and the upper roll 105 cease to revolve. The shaft 11, however, being rigidly attached to the wheel 10, turns at all times with said wheel, and thus transmits power continuously to the feed rolls.

It results from this construction that as the wire is forcibly pulled around a guide pulley 73 and through a guide tube 27 by a pair of feed rolls, it is forced to pass between the rolls 102 and 105 and to be intermittently subjected to the cutting and deforming dies 103 and 106, all as will now be more fully disclosed.

That is to say, referring more especially to Fig. 8, a wire 28, after having been pulled through the straightening mechanism 27, is first subjected to the compressing action of the members 116 of the cutting and deforming dies 103 and 106, whereupon a depression 117 is formed in said wire. As the rolls 102 and 105 continue to revolve, the cutting points 115 of said dies come into play and sever the wire, as indicated.

As the rolls 102 and 105 continue to revolve, the compressing or deforming members 118 which are in all respect duplicates of the members 116, come into play and form a depression 119 in the wire which in all respects is a duplicate of the depression 117. In other words, the two ends of the wire thus severed are each provided with a depression such as 117 and 119 for a purpose which forms no part of this invention, but which renders said wires especially adapted for use with a certain type of box banding machines not necessary to describe.

After the wire 28 has been thus severed, it passes on between a second set of feed rolls which in all respects are duplicates of the feed rolls just described and which will therefore now be only briefly referred to. That is to say, mounted on the shaft 120, see Fig. 5, is a roll 121 which is in all respect a duplicate of the roll 39 mounted on the shaft 16, while mounted on the shaft 122 is a plurality of feed rolls 123 which are in all respects duplicates of the feed rolls numbered from 52 to 55 inclusive, above described. Rigidly associated with said last mentioned rolls 123 are the driving gears 124 corresponding to the gears 44 to 47, and the U-shaped members 125 corresponding to the U-shaped members 58 to 61, all as will be clear from Figures 3, 4 and 5.

The said U-shaped members 125, see Figure 5, are each provided with a stem 126 corresponding to the stems 62 to 65 and with springs 127 like the springs 66. To each stem 126 is secured as at 128 a lever 129 which is a duplicate of the levers 92, and these said levers 129 are provided with fulcrums 130 resting on the plate 131, as in the case of the said levers 92.

One end of a link 133 is pivoted as at 132 to the upper end of each of the levers 129, and the other ends of said links are pivoted as at 91 to the upper ends of the levers 92, all as will be clear from Figs. 1, 2, 3 and 4.

It thus results that whenever a guide pulley such as 74, Fig. 2, lifts due to a kink in the wire, the tilting of the lever 92 in the manner above described will also through the link 133 tilt the lever 129 around its fulcrum 130 as a center and thus will the stem 126 and corresponding upper feed roll be lifted, to the end that the movement of the wire will be stopped.

This second set of feed rolls mounted on the shafts 120 and 122, are rotated from the power shaft 11 and gear 9 as follows: As best shown in Fig. 2, the gear 12 meshes with the gear 144 mounted on the shaft 145 and said gear 144 meshes with the gear 146 mounted on the shaft 120, which turns the roll 121, above mentioned. The roll 121 being thus turned, it imparts its motion to the corresponding feed rolls located above it in precisely the same manner as does the drum 39 impart its motion to the corresponding feed rolls above it, all as has been stated above.

Going back to Fig. 2, and shaft 20, which is turned by the sprocket 19 and belt 18, said shaft carries a gear 150, see Figs. 4 and 5, which meshes with a gear 151 carried by the member 152 on the short shaft 153. Pivotally carried by the shaft 153 is the connection 154, pivoted as at 155 to the member 156 rigid with the slidable and rotatable shaft 157 provided with the handle 158, and pointer 159, traversing the scale 160. The said pointer 159 may be provided with a spring controlled pin or plunger 175, adapted to engage any one of the series of holes 176 adjacent the scale 160, and to hold the parts in any selected position.

The parts are so proportioned that when the shaft 157 is rotated the gear 151 will revolve around the gear 150 while keeping in mesh with the same. It thus results that said gear 151 may be revolved out of contact with any one of the gears such as 161 in the cone shaped nest of gears 162, slid parallel to the shaft 163 on which said nest of gears is mounted and along the shaft 20 whereupon it may be revolved back into mesh with any other gear of said nest, such as gear 164, for example.

The shaft 20 being supplied with power continuously by the connections above described, the speed of the shaft 163 will depend upon the particular gear 161, 164, etc., with which said gear 151 is brought into contact, and this particular multiplication or reduction of the speed of shaft 163 will at all times be indicated on the scale 160 by the pointer 159. The shaft 163 carries the disk like member 165 having the toe 166 adapted at each revolution to strike the slidable bar 167, provided with the beveled end 168, and the return spring 169. Said beveled end or stop 168 when the bar is in its normal or retracted position, lies in the path of the rotating beveled end 170 of the spring controlled clutch member 111, see Figures 7, 9, and 10, and when said clutch member and stop 168 come in contact the clutch member 111 is withdrawn from the clutch member 110 causing the cutting rolls 102 and 105 to cease their rotations until the toe 166 strikes the end 175 of the bar 167 and bodily moves its stop out of the way of the end 170 of the said clutch member 111, which then engages the clutch member 110 under the influence of its spring.

The operation of this machine will be readily understood from the foregoing, but it may be briefly summarized as follows:

A plurality of wires 28 being brought from reels, not shown, and trained over their respective pulleys such as those numbered from 71 to 74, said wires are passed through the guiding and straightening barrels 27 and led between their respective pairs of feed rolls such as 35 and 52, 36 and 53, 37 and 54, 38 and 55, etc., whereupon power being applied in the manner above described, said rolls will forcibly draw said wires over their guide pulleys and through their guide tubes. Should any wire become kinked, entangled, or bent, its resistance over the guide pulleys will be abnormal, and through the action of the levers numbered from 76 to 79, and their co-acting parts, the upper one of the particular pair of feed rolls which is feeding the bent wire will be lifted from its companion lower rolls, and thus will the feeding action of that particular bent wire be stopped. In the meantime however, the machine will go on feeding the other wires, so that valuable time is saved.

The passage of the wires through the tubes 27 being accompanied by a considerable amount of friction, the feed rolls have to exert a considerable pull on the wires, which, of course, has not only the effect of straightening said wires but also of rendering them more rigid, and thus enabling the feed rolls to forcibly push the wires onward between the deforming and cutting rolls 102 and 105, which are provided with the deforming and cutting dies 103 and 106. These said deforming and cutting rolls are driven from the same motor 6 as are the feed rolls, but for a predetermined period of time the rotation of said rolls is cut off by means of the clutch and its co-acting parts illustrated in Figures 7, 9 and 10. The length of time the said die rolls are stopped will determine the length of the wire which is cut off, for the feed rolls go on continuously, and the said time of stoppage and consequently the length of the cut wire, may be readily carried at will by means of the change speed gears 150, 151, and 165, as above disclosed. This cutting off of the power from the deforming rolls takes place when the deforming dies 103 and 106 are out of mesh as is illustrated in Fig. 5, thus leaving a sufficient space between said rolls 102 and 105 to permit the feed rolls to forcibly push the wires between said deforming rolls. As the wires are thus pushed to and through said deforming rolls, they pass through the guide tubes 200 and 201, see Fig. 5, and reach the second set of feed rolls mounted on the shafts 120 and 122, all as above described. This said second set of feed rolls acts in conjunction with the first set of feed rolls above mentioned to continuously pull the wire through the machine and to deliver it to a receiving and counting machine, not disclosed.

It will thus be seen that so long as the cutting and deforming rolls 102 and 105 are inactive the wires are continuously fed through the machine, and that there may be any reasonable number of wires, so fed simultaneously through the machine. Now, the length of the wires thus fed through the machine will be determined solely by the periods of rest that are given to the cutting dies 103 and 106. This said period of rest is determined by the speed of the cone shaped nest of gears 162 illustrated in Fig. 4, which rotate the shaft 163, which latter rotates the disk like member 165, which actuates the clutch illustrated in Figs. 7, 9, and 10 to disengage the power from said cutting rolls 102 and 105.

That is to say, by manipulating the shaft 157 in the manner above disclosed, and thus bringing the gear 151, see Fig. 5, into engagement with gears of different diameters in the cone shaped nest of gears 162, the speed of the shaft 163 is increased or diminished at will, whereupon the time it takes for the disk 165 to make a complete revolution and to actuate the clutch controlling member 167 is varied, and thus is varied the interval of time during which the cutting rolls 102 and 105 are at rest. Of course, the length of the cut wires is correspondingly varied.

It will thus be seen that I have provided a machine which is especially adapted to straighten simultaneously a plurality of wires taken from a plurality of reels, to cut them into predetermined lengths which may be varied at will, and to provide each end of the cut wires with depressions such as 117, in order that they may fit a special type of box handling machine.

It is obvious that those skilled in the art may vary the details of construction, as well as the arrangement of parts without departing from the spirit of the invention, and therefore I do not wish to be limited to the above disclosure except as may be required by the claims.

What I claim is:

1. In a machine for feeding and cutting wire, the combination of a pair of wire cutting rolls; a pair of feed rolls adapted to exert a pull on the wire and to push said wire between said cutting rolls; means for lifting one of said feed rolls to disengage the wire when said pull becomes abnormal; means to rotate all of said rolls; and means to intermittently connect and disconnect said cutting rolls from said rotating means, subtantially as described.

2. In a machine for feeding and cutting wire, the combination of a pair of wire cutting rolls; a pair of feed rolls adapted to exert a pull on the wire and to push said wire between said cutting rolls; a guiding means exerting friction on the wire for guiding said wire to said feed rolls; means for lifting one of said feed rolls to disengage the wire when said pull becomes abnormal; means to rotate all of said rolls; and means to intermittently connect and disconnect said cutting rolls from said rotating means, subtantially as described.

3. In a machine for feeding and cutting wire, the combination of a pair of wire cutting rolls; a pair of feed rolls adapted to exert a pull on the wire and to push said wire between said cutting rolls; a friction generating guiding means for leading the wire to said feed rolls; means operated by the traveling wire for lifting one of said feed rolls to disengage the wire when said pull becomes abnormal; means to rotate all of said rolls; and means to intermittently connect and disconnect said cutting rolls from said rotating means, substantially as described.

4. In a machine for forcibly feeding and cutting wire, the combination of a pair of wire cutting rolls; a friction generating wire guiding means; a pair of feed rolls adapted to pull the wire through said guiding means and to push said wire between said cutting rolls; a second pair of feed rolls between which the wire passes after leaving the cutting rolls; driving means for rotating all of said rolls; means for intermittently connecting and disconnecting said cutting rolls from said driving means; and automatic means for lifting a feed roll of each pair when the said pull on the wire becomes abnormal, substantially as described.

5. In a machine for forcibly feeding and cutting wire, the combination of a pair of wire cutting rolls; a friction generating wire guiding means comprising a wire straightening tube and a guide pulley; a pair of feed rolls adapted to pull the wire through said guiding means and to push said wire between said cutting rolls; a second pair of feed rolls between which the wire passes after leaving the cutting rolls; driving means for rotating all of said rolls; means comprising a clutch for intermittently connecting and disconnecting said cutting rolls from said driving means; and automatic means for lifting a feed roll of each pair when the said pull on the wire becomes abnormal, substantially as described.

6. In a machine for feeding and cutting wire, the combination of a pair of wire cutting rolls; a pair of feed rolls adapted to exert a pull on the wire and to push said wire between said cutting rolls; means comprising a guide pulley and lever connections for lifting one of said feed rolls to disengage the wire when said pull becomes abnormal; means to rotate all of said rolls; and means comprising a clutch to intermittently connect and disconnect said cutting rolls from said rotating means, substantially as described.

7. In a machine for feeding and cutting wire, the combination of a pair of wire cutting rolls; a pair of feed rolls adapted to exert a pull on the wire and to push said wire between said cutting rolls; means comprising a guide pulley, a lever, and a spring controlled member for lifting one of said feed rolls to disengage the wire when said pull becomes abnormal; means to rotate all of said rolls; and means to intermittently connect and disconnect said cutting rolls from said rotating means, substantially as described.

8. In a machine for feeding and cutting wire, the combination of wire cutting rolls; wire feeding rolls adapted to exert a pull on the wire; means to drive all of said rolls; means to intermittently engage and disengage the wire cutting rolls from said driving means at regular intervals; and means to vary said intervals to change the length of the cut wires, substantially as described.

9. In a machine for feeding and cutting wire, the combination of wire cutting rolls; wire feeding rolls adapted to exert a pull on the wire; a wire guiding means to direct the wire to said feed rolls; means to rotate said guiding means while the wire is traveling therethrough; means to drive all of said rolls; means to intermittently engage and disengage the wire cutting rolls from said driving means at regular intervals; and means to vary said intervals to change the length of the cut wires, substantially as described.

10. In a machine for feeding and cutting wire, the combination of wire cutting rolls; wire feeding rolls adapted to exert a pull on the wire; a wire guiding friction generating tube to direct the wire to said feed rolls; gearing adapted to rotate said tube while the wire is passing therethrough; means to drive all of said rolls; means to intermittently engage and disengage the wire cutting rolls from said driving means at regular intervals; and means comprising a plurality of driving gears of different diameters to vary said intervals to change the length of the cut wires, substantially as described.

11. In a machine for feeding and cutting wire, the combination of a pair of wire cutting rolls carrying a plurality of pairs of cutting dies adapted to simultaneously cut a plurality of wires; a plurality of pairs of feed rolls adapted to feed said wires to said cutting dies; a plurality of pairs of feed rolls adapted to feed said wires from said cutting dies; driving means to rotate all of said rolls; means to connect and disconnect said cutting rolls and dies to and from said driving means at predetermined intervals; and means to vary the length of said intervals, substantially as described.

12. In a machine for feeding and cutting wire, the combination of a pair of wire cutting rolls carrying a plurality of pairs of cutting dies adapted to simultaneously cut a plurality of wires; a plurality of pairs of feed rolls adapted to feed said wires to said cutting dies; a plurality of pairs of feed rolls adapted to feed said wires from said cutting dies; driving means to rotate all of said rolls; means to connect and disconnect said cutting rolls and dies to and from said driving means at predetermined intervals; means to vary the length of said intervals; and means to automatically disengage one of said feed rolls in any pair from its companion rolls, when the particular wire being fed offers an abnormal resistance, substantially as described.

13. In a machine for feeding and cutting wire, the combination of a pair of wire cutting rolls carrying a plurality of pairs of cutting dies adapted to simultaneously cut a plurality of wires; a plurality of pairs of feed rolls adapted to feed said wires to said cutting dies; a plurality of pairs of feed rolls adapted to feed said wires from said cutting dies; driving means to rotate all of said rolls; means to connect and disconnect said cutting rolls and dies to and from said driving means at predetermined intervals; means to vary the length of said intervals; and a wire guiding pulley and lever connection for each pair of feed rolls adapted to disengage the rolls of its corresponding pair when the wire offers an abnormal resistance, substantially as described.

14. In a machine for feeding and cutting wire, the combination of a pair of wire cutting rolls carrying a plurality of pairs of wire cutting and deforming dies, adapted to simultaneously cut and deform a plurality of wires; a plurality of pairs of feed rolls each adapted to feed a different wire to said dies; a plurality of friction generating guide tubes each adapted to guide a wire to a pair of feed rolls; means for rotating each guide tube while its wire is passing therethrough; a plurality of guide pulleys, one for each guide tube and pair of feed rolls for leading the wires to their respective guide tubes; a pivoted lever supporting each pulley; and connections between each lever and its corresponding pair of feed rolls for disengaging one of the rolls of its pair when an abnormal force is required to pass the wire around its corresponding pulley; substantially as described.

15. In a machine for feeding and cutting wire in predetermined lengths, the combination of a pair of wire feeding rolls; a pair of wire deforming and cutting rolls; means for driving said cutting rolls in unison with said wire feeding rolls; means for disconnecting said cutting rolls at predetermined intervals in their rotation from said driving means; and means for changing the periods of time at which said cutting rolls are disengaged from the power to vary the length of the cut wire, substantially as described.

16. In a machine for feeding and cutting wire in predetermined lengths, the combination of a pair of wire feeding rolls; a pair of wire deforming and cutting rolls; means for driving said cutting rolls in unison with said wire feeding rolls; means for disconnecting said cutting rolls at predetermined intervals in their rotation from said driving means; and means comprising a shiftable gear and a cone shaped nest of driving gears co-acting therewith for changing the speed at which said cutting rolls are driven to vary the length of the cut wire, substantially as described.

17. In a machine for feeding and cutting wire in predetermined lengths, the combination of a pair of wire feeding rolls; a pair of wire deforming and cutting rolls; means for driving said cutting rolls in unison with said wire feeding rolls; means for disconnecting said cutting rolls at predetermined intervals in their rotation from said driving means; and means comprising a longitudinally slidable and rotatable shaft adapted to control a driving gear, and a cone shaped nest of driving gears with which said first named driving gear is adapted to engage for changing the speed at which said cutting rolls are driven to vary the length of the cut wire, substantially as described.

18. In a machine for feeding and cutting wires in predetermined lengths the combination of a plurality of pairs of wire feeding rolls; means to automatically discontinue the feeding action of any pair of said rolls when the corresponding wire offers an abnormal resistance to the feeding action; cutting and deforming rolls adapted to simultaneously deform and cut into predetermined lengths a plurality of wires fed thereto from said feeding rolls; means for rotating all of said rolls; means for automatically stopping and starting the rotation of said cutting and deforming rolls at a predetermined point in each rotation thereof; and means for varying the time between the starting and stopping operations, substantially as described.

19. In a machine for feeding and cutting wires in predetermined lengths the combination of a plurality of pairs of wire feeding rolls; means to automatically discontinue the feeding action of any pair of said rolls when the corresponding wire offers an abnormal resistance to the feeding action; cutting and deforming rolls adapted to simultaneously deform and cut into predetermined lengths a plurality of wires fed thereto from said feeding rolls; means for rotating all of said rolls; means for automatically stopping and starting the rotation of said cutting and deforming rolls at a predetermined point in each rotation thereof; and means comprising a change speed mechanism, clutch and a clutch actuating device, for varying the time between the starting and stopping operations, substantially as described.

In testimony whereof I affix my signature.

PARVIN WRIGHT.